United States Patent
Casati

(10) Patent No.: US 11,910,347 B2
(45) Date of Patent: Feb. 20, 2024

(54) METHOD AND APPARATUS FOR NETWORK CONTROLLED RADIO RESOURCE CONTROL CONNECTION ESTABLISHMENT

(71) Applicant: Nokia Technologies Oy, Espoo (FI)

(72) Inventor: Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 17/266,935

(22) PCT Filed: Aug. 9, 2019

(86) PCT No.: PCT/IB2019/056806
§ 371 (c)(1),
(2) Date: Feb. 8, 2021

(87) PCT Pub. No.: WO2020/031151
PCT Pub. Date: Feb. 13, 2020

(65) Prior Publication Data
US 2021/0306973 A1    Sep. 30, 2021

Related U.S. Application Data

(60) Provisional application No. 62/717,277, filed on Aug. 10, 2018.

(51) Int. Cl.
*H04W 60/00* (2009.01)
*H04W 8/22* (2009.01)
(Continued)

(52) U.S. Cl.
CPC .......... *H04W 60/04* (2013.01); *H04W 48/18* (2013.01); *H04W 76/10* (2018.02)

(58) Field of Classification Search
CPC ..... H04W 60/04; H04W 48/18; H04W 76/10; H04W 60/00; H04W 8/22
See application file for complete search history.

(56) References Cited

U.S. PATENT DOCUMENTS

| 2017/0303259 A1 * | 10/2017 | Lee ........................ H04W 28/16 |
| 2019/0174405 A1 | 6/2019 | Yang et al. |
| 2021/0176817 A1 * | 6/2021 | Takakura ............... H04W 76/50 |

FOREIGN PATENT DOCUMENTS

| CN | 108323245 A | 7/2018 |
| WO | 2018/008980 A1 | 1/2018 |
| WO | WO-2019185758 A1 * | 10/2019 ............ H04W 48/18 |

OTHER PUBLICATIONS

"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.

(Continued)

*Primary Examiner* — Joseph E Dean, Jr.
(74) *Attorney, Agent, or Firm* — ALSTON & BIRD LLP

(57) ABSTRACT

A method, apparatus and computer program product are provided to provide a network controlled radio resource control (RRC) connection establishment mechanism. The method, apparatus and computer program product receive a registration request originating with user equipment in a communication network. The method, apparatus and computer program product then construct a registration accept message. The registration accept message includes an Access Stratum Connection Establishment NSSAI (Network Slice Selection assistance information) Inclusion Mode parameter. The method, apparatus and computer program product then transmit the registration accept message to the user equipment.

17 Claims, 3 Drawing Sheets

(51) Int. Cl.
H04W 60/04 (2009.01)
H04W 76/10 (2018.01)
H04W 48/18 (2009.01)

(56) References Cited

OTHER PUBLICATIONS

"LS on inclusion of NSSAI in RRC Connection Establishment Procedure", 3GPP TSG SA2 Meeting 127, S2-184499, SA2, Apr. 16-20, 2018, 2 pages.

Kim et al., "3GPP SA2 Architecture and Functions for 5G Mobile Communication System", ICT Express, vol. 3, No. 1, Mar. 2017, pp. 1-8.

"3rd Generation Partnership Project; Technical Specification Group Radio Access Network; NR; Radio Resource Control (RRC) protocol specification (Release 15)", 3GPP TS 38.331, V15.2.1, Jun. 2018, pp. 1-303.

"Network controlled NSSAI for SR-related Access Stratum connection establishment", SA WG2 Meeting #129bis, S2-1813024, Nokia, Nov. 26-30, 2018, 3 pages.

"Network controlled NSSAI for SR-related Access Stratum connection establishment", SA WG2 Meeting #129bis, S2-1813025, Nokia, Nov. 26-30, 2018, 20 pages.

International Search Report and Written Opinion received for corresponding Patent Cooperation Treaty Application No. PCT/IB2019/056806, dated Nov. 19, 2019, 18 pages.

"Network Slicing in the Registration Procedure", 3GPP TSG-CT WG1 Meeting #105, C1-173561, Agenda : 15.2.1.3, ZTE, Aug. 21-25, 2017, 6 pages.

"Configured NSSAI added to Registration Accept message", 3GPP TSG-CT WG1 Meeting #111, C1-183114, Agenda : 15.2.2.8, Samsung R&D Institute UK, May 21-25, 2018, 11 pages.

"Clarlflcations to Configuration Update Procedure", 3GPP TSG-CT WG1 Meeting #110, C1-182808, Agenda : 15.2.2.8, MediaTek Inc., Apr. 16-20, 2018, 6 pages.

Office action received for corresponding Indian Patent Application No. 202147008571, dated Jan. 21, 2022, 6 pages.

Office Action for European Application No. 197791387 dated Feb. 21, 2023, 9 pages.

Office Action for Chinese Application No. 201980066241.7 dated Nov. 28, 2023, 15 pages.

* cited by examiner

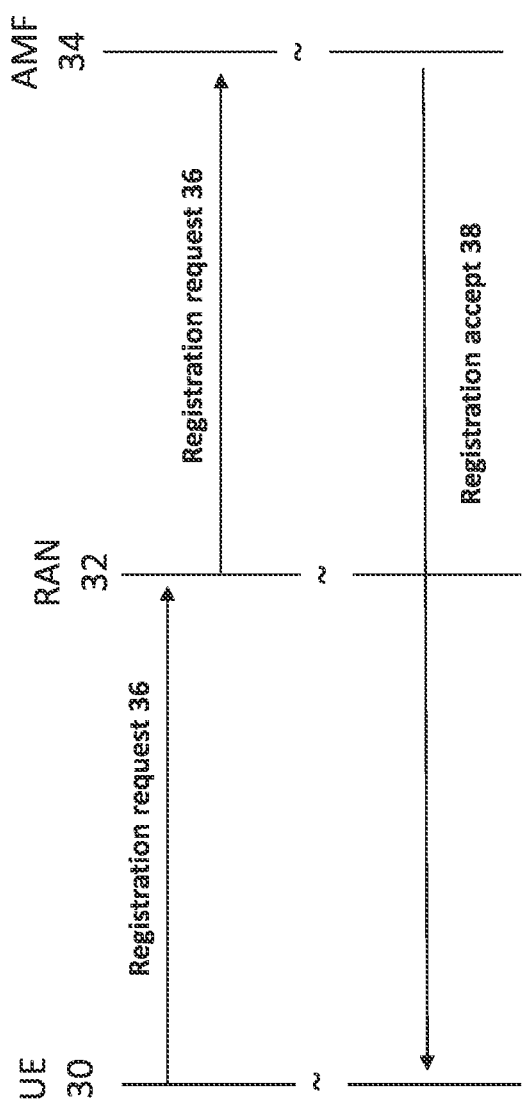

METHOD AND APPARATUS FOR NETWORK CONTROLLED RADIO RESOURCE CONTROL CONNECTION ESTABLISHMENT

The present application is a National Stage Entry filing of International Patent Application Serial No. PCT/IB2019/056806, titled "Method and Apparatus for Network Controlled Radio Resource Control Establishment," filed Aug. 9, 2019, which claims priority to, and the benefit of, U.S. Provisional Application Ser. No. 62/717,277, titled "METHOD AND APPARATUS FOR NETWORK CONTROLLED RADIO RESOURCE CONTROL CONNECTION ESTABLISHMENT," filed Aug. 10, 2018, the entire contents of each of which are hereby incorporated herein by reference in their entireties for all purposes.

TECHNICAL FIELD

An example embodiment relates generally to a method, apparatus and computer program product for providing a network controlled radio resource control (RRC) connection establishment mechanism.

BACKGROUND

In cellular systems such as the Evolved Packet System (EPS) or the fifth generation (5G) network system, a user equipment (UE) may establish a RRC connection with a radio access network (RAN) by sending a RRC connection establishment request. Some information may be provided in the RRC connection for the purpose of allowing the RAN to apply various policies, such as accepting the RRC connection establishment request, rejecting the RRC connection establishment request, or releasing the RRC connection establishment request. The RRC connection establishment request may be triggered by a service request in a 5G system.

Network slice selection assistance information (NSSAI) is one type of information that could be provided by the UE to the RAN. In a RRC connection establishment request, the UE may include a NSSAI which could be: the Allowed NSSAI (e.g., the list of S-NSSAIs associated to the Network Slices the UE is allowed to use at the time it requests the RRC connection to be established, see 3GPP TS 23.501 for an example definition), one or more S-NSSAI (Single NSSAI) associated to the Network Slices of which there is data or signalling to be transmitted at the time the UE requests RRC connection to be established, or no NSSAI at all. The RAN may process the RRC connection establishment request depending on the NSSAI or lack thereof. Currently, there is no definition regarding what NSSAI, if any, the RRC connection establishment request would include. Various proposals were provided to address this issue. However, these proposals do not allow flexible RRC connection establishment behaviour.

BRIEF SUMMARY

An example embodiment relates generally to a method, apparatus and computer program product for providing a network controlled radio resource control (RRC) connection establishment mechanism. In one example embodiment, a method is provided that includes receiving a registration request originating with user equipment in a communication network. The method further includes constructing a registration accept message. The registration accept message includes an Access Stratum Connection Establishment NSSAI (Network Slice Selection assistance information) Inclusion Mode parameter. The method further includes transmitting the registration accept message to the user equipment.

In some implementations of such a method, the Access Stratum Connection Establishment NSSAI Inclusion Mode parameter indicates what, if any, NSSAI the user equipment needs to transmit in an access stratum connection establishment procedure. In some embodiments, the registration request comprises an access stratum connection establishment request that is triggered by a service request based on, that is, triggered by, pending data or signaling related to one or more network slices. In some embodiments, the Access Stratum Connection Establishment NSSAI Inclusion Mode parameter indicates whether the user equipment will transmit one of: an Allowed NSSAI for the user equipment or one or more S-NSSAIs associated with the network slice or network slices which trigger the service request. In some embodiments, the Access Stratum Connection Establishment NSSAI Inclusion Mode parameter is derived based on a set of policies implemented in one or more radio access nodes in a registration area of the communication network.

In another example embodiment, an apparatus is provided that includes means for receiving a registration request originating with user equipment in a communication network. The apparatus further includes means for constructing a registration accept message. The registration accept message includes an Access Stratum Connection Establishment NSSAI (network slice selection assistance information) Inclusion Mode parameter. The apparatus further includes means for transmitting the registration accept message to the user equipment.

In some implementations of such an apparatus, the Access Stratum Connection Establishment NSSAI Inclusion Mode parameter indicates what, if any, NSSAI the user equipment needs to transmit in an access stratum connection establishment procedure. In some embodiments, the registration request comprises an access stratum connection establishment request that is triggered by a service request based on, that is, triggered by, pending data or signaling related to one or more network slices. In some embodiments, the Access Stratum Connection Establishment NSSAI Inclusion Mode parameter indicates whether the user equipment will transmit one of: an Allowed NSSAI for the user equipment or one or more S-NSSAIs associated with the network slice or network slices which trigger the service request. In some embodiments, the Access Stratum Connection Establishment NSSAI Inclusion Mode parameter is derived based on a set of policies implemented in one or more radio access nodes in a registration area of the communication network.

In another example embodiment, an apparatus is provided that includes at least one processor and at least one memory including computer program code for one or more programs with the at least one memory and the computer program code configured to, with the at least one processor, cause the apparatus at least to receive a registration request originating with user equipment in a communication network. The computer program code is further configured to, with the at least one processor, cause the apparatus to construct a registration accept message. The registration accept message includes an Access Stratum Connection Establishment NSSAI (network slice selection assistance information) Inclusion Mode parameter. The computer program code is further configured to, with the at least one processor, cause the apparatus to transmit the registration accept message to the user equipment.

In some implementations of such an apparatus, the Access Stratum Connection Establishment NSSAI Inclusion Mode parameter indicates what, if any, NSSAI the user equipment needs to transmit in an access stratum connection establishment procedure. In some embodiments, the registration request comprises an access stratum connection establishment request that is triggered by a service request based on, that is, triggered by, pending data or signaling related to one or more network slices. In some embodiments, the Access Stratum Connection Establishment NSSAI Inclusion Mode parameter indicates whether the user equipment will transmit one of: an Allowed NSSAI for the user equipment or one or more S-NSSAIs associated with the network slice or network slices which trigger the service request. In some embodiments, the Access Stratum Connection Establishment NSSAI Inclusion Mode parameter is derived based on a set of policies implemented in one or more radio access nodes in a registration area of the communication network.

In another example embodiment, a computer program product is provided that includes at least one non-transitory computer-readable storage medium having computer executable program code instructions stored therein with the computer executable program code instructions comprising program code instructions configured, upon execution, to receive a registration request originating with user equipment in a communication network. The computer executable program code instructions comprise program code instructions that are further configured, upon execution, to construct a registration accept message. The registration accept message includes an Access Stratum Connection Establishment NSSAI (network slice selection assistance information) Inclusion Mode parameter. The computer executable program code instructions also comprise program code instructions that are further configured, upon execution, to transmit the registration accept message to the user equipment.

In some implementations of such a computer program product, the Access Stratum Connection Establishment NSSAI Inclusion Mode parameter indicates what, if any, NSSAI the user equipment needs to transmit in an access stratum connection establishment procedure. In some embodiments, the registration request comprises an access stratum connection establishment request that is triggered by a service request based on, that is, triggered by, pending data or signaling related to one or more network slices. In some embodiments, the Access Stratum Connection Establishment NSSAI Inclusion Mode parameter indicates whether the user equipment will transmit one of: an Allowed NSSAI for the user equipment or one or more S-NSSAIs associated with the network slice or network slices which trigger the service request. In some embodiments, the Access Stratum Connection Establishment NSSAI Inclusion Mode parameter is derived based on a set of policies implemented in one or more radio access nodes in a registration area of the communication network.

BRIEF DESCRIPTION OF THE DRAWINGS

Figure 1:
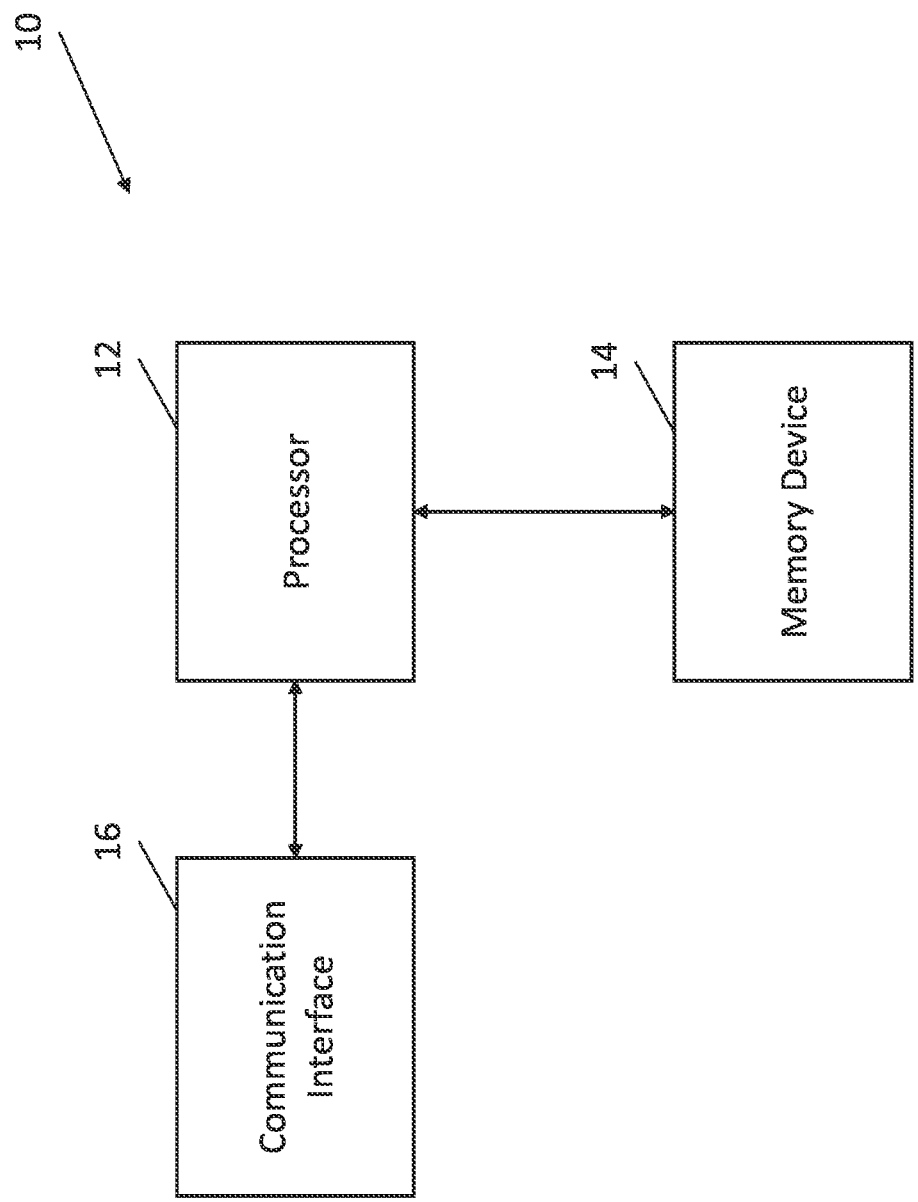
Figure 2:
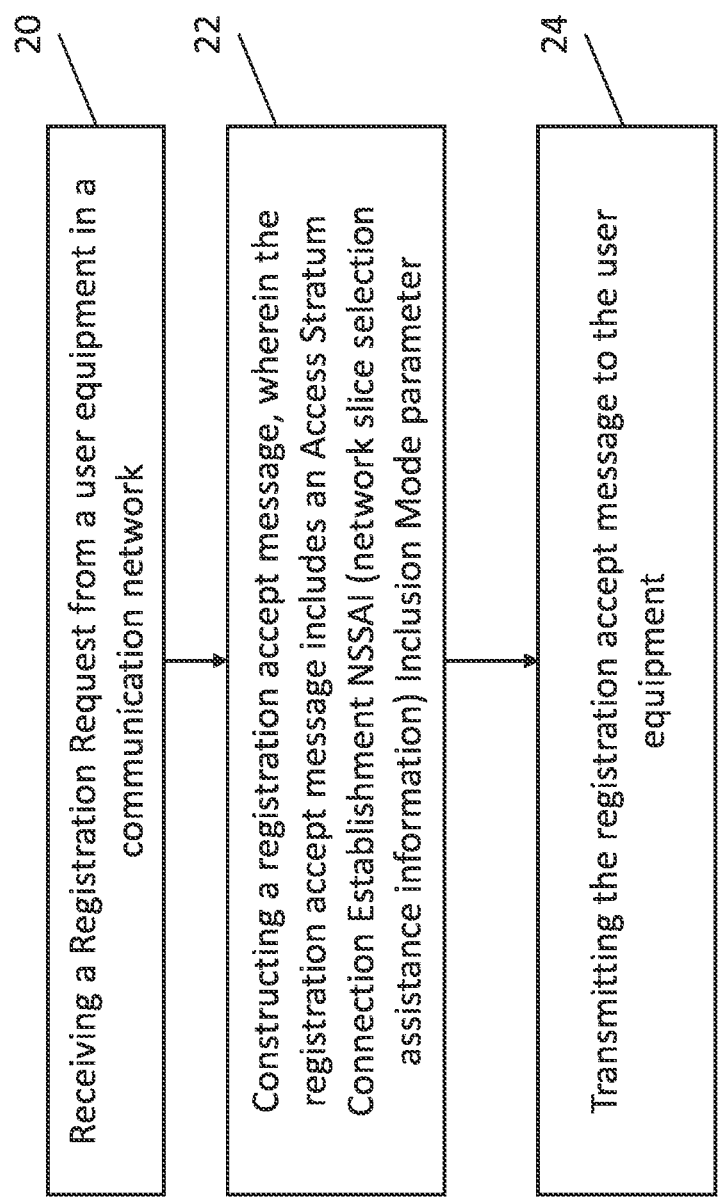

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flowchart depicting operations performed, such as by the apparatus of FIG. 1, in accordance with an example embodiment of the present disclosure; and FIG. 3 illustrates example transmissions between a user equipment and a core network in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and need to not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms need to not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium" refers to a physical storage medium (e.g., volatile or non-volatile memory device).

An example embodiment relates generally to a method, apparatus and computer program product for providing a network controlled radio resource control (RRC) connection establishment mechanism.

In cellular-systems such as the Evolved Packet System (EPS) or the fifth generation (5G) network system, a user equipment (UE) may establish an Access Stratum connection (e.g. RRC connection) with a radio access network (RAN) by sending e.g. a RRC connection establishment request (see 3GPP TS 38.331). Some information may be provided in the RRC connection establishment procedure for the purpose of allowing the RAN to apply various policies, such as accepting the RRC connection establishment request or releasing the RRC connection establishment request. The RRC connection establishment request may be triggered by a service request in a 5G system.

Network slice selection assistance information (NSSAI) is one type of information that could be provided by the UE to the RAN. In a RRC connection establishment request, the UE may include a NSSAI which could be: the Allowed NSSAI (e.g., the list of S-NSSAIs associated to the Network Slices the UE is allowed to use at the time the UE requests the RRC connection to be established), one or more S-NSSAI (Single NSSAI) associated to the Network Slices of which there is data or signalling to be transmitted at the time the UE requests the RRC connection to be established, or no NSSAI at all. A NSSAI is a collection of S-NSSAIs. Each S-NSSAI identifies a network slice in the 5G network system. Example S-NSSAIs include a slice/service type (SST) and a slice differentiator (SD). The SST indicates expected network slice behaviour such as features and services provided. The SD includes optional information that differentiates amongst multiple network slices that are of the same slice/service type.

The RAN may process the RRC connection establishment request depending on the NSSAI or lack thereof. Currently, there is no definition regarding what NSSAI, if any, the RRC connection establishment request would include. Various proposals are provided to address this issue. One proposal is to include S-NSSAI(s) for the slices that have data or signalling to transmit at the time the Service Request is triggering the RRC connection establishment, another proposal is to include the Allowed NSSAI which includes a collection of S-NSSAIs, and yet another proposal is to not include any NSSAI at all. However, these proposals do not allow a flexible deployment for RRC connection establishment.

An example embodiment relates generally to a method, apparatus and computer program product for providing a network controlled radio resource control (RRC) connection establishment mechanism that allows such flexible deployment.

In order to embody the core network including a RAN and an access and mobility management function, an apparatus 10 is provided and as shown, for example, in FIG. 1. The apparatus may be embodied by any of a variety of different components such as different nodes of a 5G core network instance. As shown in FIG. 1, the apparatus of an example embodiment includes, is associated with or is otherwise in communication with a processor 12, an associated memory 14 and a communication interface 16.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 2 is a flowchart illustrating a workflow of a core network in accordance with an example embodiment. At block 20, the core network receives, for example by using means such as the processor 12 and the communication interface 16, a registration request from a user equipment in a communication network.

After the core network receives the registration request from the user equipment, the core network constructs, for example by using means such as the processor 12, at block 22, a registration accept message. The registration accept message includes a connection establishment NSSAI (network slice selection assistance information) inclusion mode parameter. The registration accept message includes an Access Stratum Connection Establishment NSSAI Inclusion Mode parameter which defines what NSSAI, if any, the UE would include in a subsequent Access Stratum connection establishment such as, for example, a RRC message 5 part of the RRC connection Establishment procedure defined in 3GPP TS 38.331. In some embodiments, the Access Stratum Connection Establishment NSSAI Inclusion Mode parameter defines whether the UE would include 1) an allowed NSSAI for the UE, e.g., a NSSAI set to the Allowed NSSAI for the UE defined in 3GPP TS 23.501, 2) a NSSAI including one or more S-NSSAIs of one or more network slices that triggers the connection establishment, or 3) no NSSAI. In some embodiments, an AMF in the core network may construct the registration accept message. The Allowed NSSAI may include one or more S-NSSAIs.

In some embodiments, the Access Stratum Connection Establishment NSSAI Inclusion Mode parameter is constructed based on a set of policies implemented in a set of RAN/AN nodes in a registration area that is assigned to the UE by the core network in the Registration Accept message. For example, if at least some (R)AN node in the registration area of the core network require information regarding all the NSSAIs in the allowed NSSAI, the Access Stratum Connection Establishment NSSAI Inclusion Mode parameter may indicate that an Allowed NSSAI for the UE, e.g., a NSSAI set to the Allowed NSSAI for the UE, needs to be transmitted from the UE to the core network. If no (R)AN node in the registration area requires information regarding all the S-NSSAIs in the Allowed NSSAI for the UE, the Access Stratum Connection Establishment NSSAI Inclusion Mode parameter may indicate that a NSSAI including one or more S-NSSAIs of one or more network slices that triggers the connection establishment needs to be transmitted. In some embodiments, if no (R)AN node in the Registration area requires information regarding all the NSSAIs in the allowed NSSAI, the Access Stratum Connection Establishment NSSAI Inclusion Mode parameter may indicate that no NSSAI needs to be transmitted.

In some embodiments, in order to let the RAN have information regarding the Allowed NSSAI, e.g., for the purpose of implementing network slice aware overload control mechanisms, the Access Stratum Connection Establishment NSSAI Inclusion Mode parameter may indicate that an allowed NSSAI for the UE needs to be transmitted from the UE to the core network.

After the core network constructs the registration accept message, the core network, for example by using means such as the processor 12, at block 24, transmits the registration accept message to the user equipment. In some embodiments, the AMF may transmit the registration accept message to the user equipment. In some embodiments, the user equipment may transmit a RRC connection establishment message in accordance with the Access Stratum Connection Establishment NSSAI Inclusion Mode parameter received. As illustrated in FIG. 3, the AMF 34 transmits a registration accept message 38 to the UE 30.

As described above, FIG. 2 is a flowchart of an apparatus 10, method, and computer program product according to an example embodiment. It will be understood that each block of the flowchart, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it need to be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method performed by a core network apparatus, the method comprising:
   receiving a registration request originated from a user equipment in a communication network;
   constructing a registration accept message, wherein the registration accept message includes an indication comprising an access stratum connection establishment network slice selection assistance information (NSSAI) inclusion mode parameter, the access stratum connection establishment NSSAI inclusion mode parameter defining whether NSSAI should be included by the user equipment in an access stratum connection establishment procedure, wherein the access stratum connection establishment NSSAI inclusion mode parameter is derived based on a set of policies implemented in one or more radio access nodes in a registration area of the communication network;
   causing transmission of the registration accept message towards the user equipment; and
   receiving a connection establishment message originated from the user equipment according to the access stratum connection establishment network slice selection assistance information inclusion mode parameter.

2. The method according to claim 1, wherein the access stratum connection establishment NSSAI inclusion mode parameter indicates one or more NSSAIs that the user equipment needs to transmit in an access stratum connection establishment procedure.

3. The method according to claim 1, wherein the access stratum connection establishment NSSAI inclusion mode parameter indicates that the user equipment does not need to transmit any NSSAI in an access stratum connection establishment procedure.

4. The method according to claim 1, further comprising triggering, by a service request, based on pending data or signaling related to one or more network slices, an access stratum connection establishment request.

5. The method according to claim 4, wherein the access stratum connection establishment NSSAI inclusion node parameter indicates whether the user equipment will transmit one of: an Allowed NSSAI for the user equipment or one or more Single-NSSAIs (S-NSSAIs) associated with the network slice or network slices which trigger the service request.

6. An apparatus comprising at least one processor and at least one memory including computer program code for one or more programs, the at least one memory and the computer program code configured to, with the at least one processor of a core network apparatus, cause the core network apparatus at least to:
   receive a registration request originated from a user equipment in a communication network;
   construct a registration accept message, wherein the registration accept message includes an indication comprising an access stratum connection establishment network slice selection assistance information (NSSAI) inclusion mode parameter, the access stratum connection establishment NSSAI inclusion mode parameter defining whether NSSAI should be included by the user equipment in an access stratum connection establishment procedure, wherein the access stratum connection establishment NSSAI inclusion mode parameter is derived based on a set of policies implemented in one or more radio access nodes in a registration area of the communication network;
   cause transmission of the registration accept message towards the user equipment; and
   receive a connection establishment message originated from the user equipment according to the access stratum connection establishment network slice selection assistance information inclusion mode parameter.

7. The apparatus according to claim 6, wherein, the access stratum connection establishment NSSAI inclusion mode parameter indicates one or more NSSAIs that the user equipment needs to transmit in an access stratum connection establishment procedure.

8. The apparatus according to claim 6, wherein the access stratum connection establishment NSSAI inclusion mode parameter indicates that the user equipment does not need to transmit any NSSAI in an access stratum connection establishment procedure.

9. The apparatus according to claim 6, wherein the registration request comprises an access stratum connection establishment request that is triggered by a service request that is triggered by pending data or signaling based on one or more network slices.

10. The apparatus according to claim 9, wherein the access stratum connection establishment NSSAI inclusion node parameter indicates whether the user equipment will transmit one of: an Allowed NSSAI for the user equipment or one or more Single-NSSAIs (S-NSSAIs) associated with the network slice or network slices which trigger the service request.

11. A computer program product comprising at least one non-transitory computer-readable storage medium having computer-executable program code instructions stored therein, the computer-executable program code instructions comprising program code instructions configured, upon execution by a processor of a core network apparatus, to cause the core network apparatus to:
   receive a registration request originated from a user equipment in a communication network;
   construct a registration accept message, wherein the registration accept message includes an indication comprising an access stratum connection establishment network slice selection assistance information (NSSAI) inclusion mode parameter, the access stratum connection establishment NSSAI inclusion mode parameter defining whether NSSAI should be included by the user equipment in an access stratum connection establishment procedure, wherein the access stratum connection establishment NSSAI inclusion mode parameter is derived based on a set of policies implemented in one or more radio access nodes in a registration area of the communication network;
cause transmission of the registration accept message towards the user equipment; and
receive a connection establishment message originated from the user equipment according to the access stratum connection establishment network slice selection assistance information inclusion mode parameter.

12. The computer program product according to claim 11, wherein the access stratum connection establishment NSSAI inclusion mode parameter indicates one or more NSSAIs that the user equipment needs to transmit in an access stratum connection establishment procedure.

13. The computer program product according to claim 11, wherein the access stratum connection establishment NSSAI inclusion mode parameter indicates that the user equipment does not need to transmit any NSSAI in an access stratum connection establishment procedure.

14. The computer program product according to claim 11, wherein the computer-executable program code instructions comprising program code instructions configured, upon execution, to:
trigger, by a service request, based on pending data or signaling related to one or more network slices, an access stratum connection establishment request,
and wherein the access stratum connection establishment NSSAI inclusion node parameter indicates whether the user equipment will transmit one of: an Allowed NSSAI for the user equipment or one or more Single-NSSAIs (S-NSSAIs) associated with the network slice or network slices which trigger the service request.

15. A user equipment apparatus of a communication network, the user equipment apparatus comprising at least one processor and at least one memory including computer program code for one or more programs, the at least one memory and the computer program code configured to, with the at least one processor, cause the user equipment apparatus at least to:
provide, to a core network of the communication network, a registration request originated from the user equipment apparatus;
receive a registration accept message from the core network, the registration accept message comprising an access stratum connection establishment network slice selection assistance information (NSSAI) inclusion mode parameter, the access stratum connection establishment NSSAI inclusion mode parameter defining whether NSSAI should be included by the user equipment apparatus in an access stratum connection establishment procedure, wherein the access stratum connection establishment network slice selection assistance information inclusion mode parameter is derived based on a set of policies implemented in one or more radio access nodes in a registration area of the communication network;
generate a connection establishment message according to the access stratum connection establishment network slice selection assistance information inclusion mode parameter; and
cause transmission of the connection establishment message towards the core network.

16. A method performed by a user equipment of a communication network, the method comprising:
providing, to a core network of the communication network, a registration request originated from the user equipment;
receiving a registration accept message from the core network, the registration accept message comprising an access stratum connection establishment network slice selection assistance information (NSSAI) inclusion mode parameter, the access stratum connection establishment NSSAI inclusion mode parameter defining whether NSSAI should be included by the user equipment apparatus in an access stratum connection establishment procedure, wherein the access stratum connection establishment network slice selection assistance information inclusion mode parameter is derived based on a set of policies implemented in one or more radio access nodes in a registration area of the communication network;
generating a connection establishment message according to the access stratum connection establishment network slice selection assistance information inclusion mode parameter;
and
causing transmission of the connection establishment message towards the core network.

17. A computer program product comprising at least one non-transitory computer-readable storage medium having computer-executable program code instructions stored therein, the computer-executable program code instructions comprising program code instructions configured, upon execution by a processor of a user equipment apparatus, cause the user equipment apparatus to:
provide, to a core network of the communication network, a registration request originated from the user equipment apparatus;
receive, at a user equipment, a registration accept message from the core network, the registration accept message comprising an access stratum connection establishment network slice selection assistance information (NSSAI) inclusion mode parameter, the access stratum connection establishment NSSAI inclusion mode parameter defining whether NSSAI should be included by the user equipment apparatus in an access stratum connection establishment procedure, wherein the access stratum connection establishment network slice selection assistance information inclusion mode parameter is derived based on a set of policies implemented in one or more radio access nodes in a registration area of the communication network;
generate a connection establishment message according to the access stratum connection establishment network slice selection assistance information inclusion mode parameter;
and
cause transmission of the connection establishment message towards the core network.

* * * * *